US009019586B2

(12) United States Patent
Ghai et al.

(10) Patent No.: US 9,019,586 B2
(45) Date of Patent: Apr. 28, 2015

(54) DEVICE FOR GENERATING OPTICAL VORTEX

(75) Inventors: Devinder Pal Ghai, New Delhi (IN); Anil Kumar Maini, New Delhi (IN)

(73) Assignee: Defence Research Development Organization, New Delhi (IN)

( * ) Notice: Subject to any disclaimer, the term of this patent is extended or adjusted under 35 U.S.C. 154(b) by 56 days.

(21) Appl. No.: 13/430,214

(22) Filed: Mar. 26, 2012

(65) Prior Publication Data
US 2013/0250389 A1     Sep. 26, 2013

(30) Foreign Application Priority Data

Mar. 24, 2012   (IN) .............................. 869/DEL/2012

(51) Int. Cl.
*G02B 26/08* (2006.01)
(52) U.S. Cl.
CPC ................................... *G02B 26/0858* (2013.01)
(58) Field of Classification Search
USPC ............... 359/290–292, 295, 485.01, 485.07, 359/838–839, 846–849; 356/450–452
See application file for complete search history.

(56) References Cited

PUBLICATIONS

Devinder Pal Ghai, Generation of optical vortices with an adaptive helical mirror, vol. 50,No. 10,p. 1374-1381, Apr. 1, 2011.*
Devinder Pal Ghai P. Senthilkumaran,and R.S.Sirohi, Adaptive helical mirror for generation of optical phase singularity, vol. 47, No. 10,p. 1378-1383, Apr. 1, 2008.*

* cited by examiner

*Primary Examiner* — Ricky Mack
*Assistant Examiner* — Robert E Tallman
(74) *Attorney, Agent, or Firm* — DeLizio Gilliam, PLLC

(57) ABSTRACT

A device for generating optical vortex of desired topological charge is disclosed. The device comprises a circular mirror having hole at its centre and a radial slit. The mirror comprises a piezoelectric actuator. The actuator comprises a hollow tube having inner diameter equal to the diameter of the hole of the mirror, a through cut extending along the length of the tube from an inner till an outer diameter, and an inner and outer electrode being formed on inner and outer wall of the tube respectively, wherein the length of the electrode increases continuously in the azimuth direction across said outer wall. The Actuator is coaxially joined to the mirror such that the slit formed between the inner and outer diameter of the tube overlaps with the radial slit. Shape of the mirror undergoes azimuthal expansion upon applying excitation voltage across electrodes forming single turn helix to generate optical vortex.

13 Claims, 6 Drawing Sheets

DEVICE FOR GENERATING OPTICAL VORTEX

TECHNICAL FIELD

Embodiments of the inventive subject matter generally relate to generation of optical vortex, and more particularly to a device for generating optical vortex.

BACKGROUND

Optical vortexes are light beams that travel in helical patterns around their axis of propagation. The electromagnetic waves comprising the beam may cancel each other out at the axis. Thus, the cross-section of an optical vortex beam may resemble a circle of light with a hole aligned at the axis.

An optical vortex is primarily a helical phase ramp accompanied by intensity null and a phase ambiguity at the vortex point. In a plane lateral to the direction of propagation of vortex beam, the wave front undergoes continuous azimuthal phase variation. Such an optical vortex is described by wave field $\exp(tl\phi)$ where $\phi$ is the azimuthal angle and l represents topological charge of the vortex field. The topological charge of the optical vortex is a measure of its helicity. Its magnitude determines the number of cycle of $2\pi$ phase change in one revolution about the vortex point and its sign provides information relating direction of phase circulation, clockwise or anticlockwise, of the helical wave. Optical vortices find many applications in a wide variety of fields such as trapping and rotation of micro particles, laser cooling, Quantum data encryption, phase contrast microscopy and image processing.

Some of the devices used for generation of an optical vortex, well known in the prior art, include computer generated hologram (CGH), spiral phase plate (SPP), lithographically etched mirror (LEM) and spatial light modulator (SLM). A major drawback of the devices like CGH, SPP, and LEM is that they can generate vortex with only a fixed topological charge and for a specific wavelength. An SLM can be used for generation of vortex of desired topological charge but its diffraction efficiency is very poor. Moreover, it cannot withstand high optical power which is a prime requirement in certain applications of vortex beams such as optical maneuvering (trapping, rotation and stacking) of micro particles, laser cooling and so on. Segmented and bimorph deformable mirror exhibit flexibility in generation of a vortex and can withstand reasonably large optical power. However, both these devices generate optical vortices, where azimuthal phase variation is not continuous but varies in discrete steps.

Further, the prior art devices cannot be used for any wavelengths or any range of wavelengths for generating optical vortices. The prior art devices are adapted for generating optical vortex only for fixed wavelengths.

The limitations and disadvantages of conventional and traditional approaches of generating optical vortex are apparent to one of skill in the art and hence, there exists a strong need to provide a device for effective generation of optical vortex, at the same time, simple to implement and which overcomes the above mentioned problems. Various embodiments describe a device wherein the above mentioned shortcomings in the generation of optical vortices are taken care of.

OBJECTIVE

An object of the embodiments is to provide a device for generating optical vortex.

Another object of the embodiments is to provide a device for generating optical vortex for any given wavelength in the visible, infrared or ultra violet regions of electromagnetic spectrum.

Yet another object of the embodiments is to provide a device for generating optical vortex of variable topological charge by varying the magnitude and sign of the excitation voltage.

Furthermore object of the embodiments is to provide a device for generating optical vortices, where azimuthal phase variation is continuous and not in discrete steps.

It is noted, however, that further objections of the embodiments will be apparent based on the embodiments described herein.

SUMMARY

According to an embodiment of the present application, a device for generating optical vortex, comprising: a circular mirror having a hole at its center and a radial slit extending from the hole till the periphery of the mirror; and a piezoelectric actuator, comprising a hollow tube having, the inner diameter being equal to the diameter of the hole of the mirror, a through cut provided along the length of the tube extending from an inner diameter till an outer diameter of the tube, an inner electrode being formed on inner wall of the tube; and an outer electrode being formed on outer wall of the tube such that the length of the electrode increases continuously in the azimuth direction across said outer wall; wherein, the piezoelectric actuator is coaxially joined to the mirror so that slit formed between the inner and the outer diameter of the tube overlaps with the radial slit of the mirror; when an excitation voltage is applied across the inner and the outer electrodes, the tube under goes a change in length which in turn transforms shape of the mirror into single turn helix.

According to yet another embodiment, the reflective side of the mirror is coated with silver.

According to further embodiment, the said inner and outer walls of piezo-electric tube are coated with silver to form electrodes.

According to furthermore embodiment, the outer electrode formed on the outer wall of the tube is helical in shape.

According to another embodiment, the hollow tube of the said piezo-electric actuator is made up of piezo ceramic material.

According to yet another embodiment, the piezo ceramic material of the tube is poled along radial direction.

According to further embodiment, the length of piezoelectric tube varies along azimuthal direction by way of expansion or contraction upon application of the excitation voltage across the electrodes.

According to furthermore embodiment, one end of the tube is joined to the non refractive side of the mirror by means of adhesive.

According to another embodiment, other end of the piezoelectric tube is glued securely to a ceramic ring by means of an adhesive and the entire assembly is held in a tilt mount for providing tilt motion along two orthogonal directions.

According to yet another embodiment, the azimuthal phase variation of generated optical vortex is continuous.

According to further embodiment, further comprises a voltage source for varying the topological charge of the optical vortex both in magnitude and sign.

In the above paragraphs the features of some embodiments have been outlined, in order that the detailed description thereof that follows may be better understood and in order that the present contribution to the art may be better understood and in order that the present contribution to the art may be better appreciated. There are, of course, additional features of the inventive subject matter that will be described hereinafter and which will form the subject of the claims appended hereto. Those skilled in the art will appreciate that the conception upon which this disclosure is based may readily be utilized as a basis for the designing of other structures for carrying out the several purposes of the inventive subject matter. It is important therefore that the claims be regarded as including such equivalent constructions as do not depart from the spirit and scope of the inventive subject matter.

BRIEF DESCRIPTION OF THE FIGURES

Further aspects and advantages of the inventive subject matter will be readily understood from the following detailed description with reference to the accompanying drawings. Reference numerals have been used to refer to identical or similar functionally similar elements. The figures together with a detailed description below, are incorporated in and form part of the specification, and serve to further illustrate the embodiments or aspects and explain various principles and advantages.

DETAILED DESCRIPTION OF EMBODIMENT(S)

Figure 1:
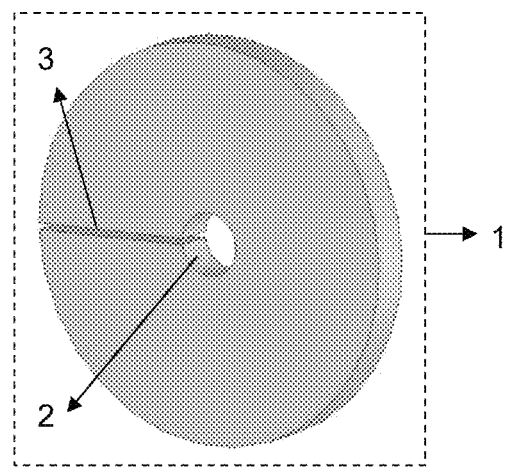
FIG. 1 illustrates a thin flat circular mirror in accordance with an embodiment.

In order that the inventive subject matter may be readily understood and put into practical effect, reference will now be made to exemplary embodiments as illustrated with reference to the accompanying drawings, where like reference numerals refer to identical or functionally similar elements throughout the separate views. The figures together with a detailed description below, are incorporated in and form part of the specification, and serve to further illustrate the embodiments and explain various principles and advantages.

The terms "comprises", "comprising", or any other variations thereof, are intended to cover a non-exclusive inclusion, such that a process, method that comprises a list of steps does not include only those steps but may include other steps not expressly listed or inherent to such process, method. Similarly, one or more elements in a system or apparatus proceeded by "comprises . . . a" does not, without more constraints, preclude the existence of other elements or additional elements in the system or apparatus.

The device as described in the embodiments of the present application comprises a specially designed, thin flat circular mirror driven with a tubular piezo-electric actuator. The mirror is provided a narrow hole at the center and a cut along its radius. The design of piezo-electric tubular actuator is such that it undergoes azimuthally varying expansion or contraction, on getting the excitation voltage. As a result, the mirror experiences a push or pull from behind that varies continuously in the azimuthal direction and therefore bends into the shape of a single turn helix. A plane wave reflected from such a mirror would undergo path length variation in the azimuthal direction, resulting in the formation of an optical vortex.

As regards FIG. 1, the said figure illustrates the construction of an adaptive helical mirror (AHM) for generation of optical vortex. The thin flat circular mirror (1) comprises a hole at its center (2) and a radial cut extending from the said hole till the periphery of the mirror. The mirror has a diameter of 25 mm and thickness 2.5 mm. The hole provided at the center of the mirror is nearly 4 mm in one embodiment. Moreover, less thickness in the mirror substrate prevents development of non-uniform stress along the radial direction when it is loaded with azimuthal force. However, less mirror thickness creates practical problems in ensuring the initial flatness of the mirror. We have chosen substrate dimensions such that the diameter-to-thickness ratio is at least 10.

The said mirror not limiting to is made of $BK_7$ Grade optical glass with sliver coating on one of its sides. One of the flat ends of the substrate is polished to provide flatness better than $\lambda=4$ at 632:8 nm. The polished surface of the substrate is silver-coated to provide reflectivity of better than 98%. The radial cut which starts from center of the mirror and extending till its periphery is 0.2 mm wide.

Figure 2:
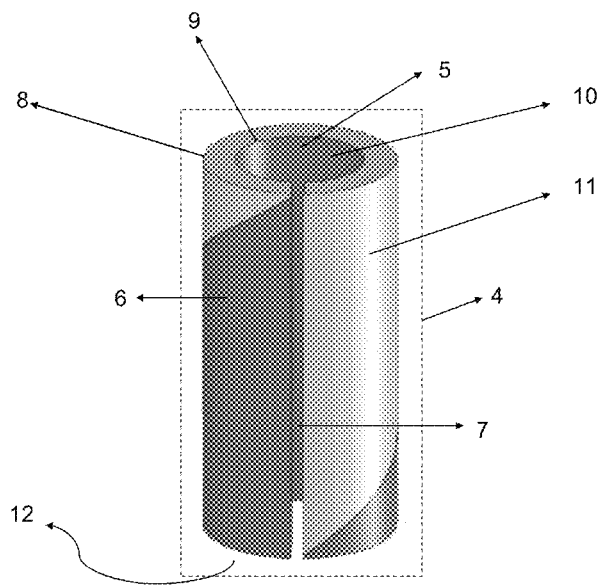
FIG. 2 illustrates a piezo-electric tubular actuator, used for bending the mirror in the form of a single turn helix in accordance with an embodiment.

FIG. 2 depicts the tubular piezo-electric actuator (4) for generating optical vortex according to an embodiment. The piezo-electric actuator, comprising: a hollow tube (12) having the inner diameter (9) being equal to the diameter of the hole of the mirror, a through cut (7) provided along the length of the tube extending from an inner diameter (9) till an outer diameter (8) of the tube, an inner electrode (5) being formed on inner wall (10) of the tube; and an outer electrode (6) being formed on outer wall (11) of the tube. The said length of the outer electrode varies in helical shape across the outer wall. The length of the outer electrode formed on the outer wall continuously increases from minimum on side of the cut to maximum on the other side of the cut in azimuthal direction across the outer wall.

The tube is made up of a widely used ceramic material $Pb(ZrTi)O_3$, commonly known as PZT. In the current embodiment, we have used a 1 mm thick PZT tube having length of 12.5 mm. The inner and outer diameters of the tube are 4 mm and 6 mm, respectively. Silver electrodes are provided on both the inner and outer side of the PZT tube. The inner electrode (5) covers the entire inner wall of the PZT tube, whereas the outer electrode (6) has helical shape i.e. length of outer electrode varies continuously in the azimuthal direction. The tube is provided 0.2 mm wide longitudinal cut (7) (a cut along length of the tube) in such a way that the length of the outer electrode is maximum on one side of the cut and minimum on the other side. The piezo-ceramic tube is poled along radial direction. Further the device comprising a voltage source (not shown) for applying voltage across the electrodes of the tubes. When an excitation voltage is applied between the two electrodes of PZT tube, it results in elongation or contraction along the length of the tube depending upon the polarity of the voltage. The change in length is given by the equation.

$$\Delta l = \frac{V d_{31} l}{t} \qquad (1)$$

where $\Delta l$ is the increase in length of the PZT tube, l is its initial length, t is the thickness of the tube, $d_{31}$ is the transverse piezo-electric co-efficient of the piezo-ceramic and V is the excitation voltage. The piezo-electric co-efficient $d_{31}$ of the material used for the PZT tube is 115 pm/V (Pico-meter per volt). Because of presence of helical electrode on the outer wall, the effective length of the PZT tube which undergoes expansion or contraction, on the application of excitation voltage, varies in the azimuthal direction being maximum on one side of the longitudinal cut and minimum on the other side. The resulting expansion or contraction of the tube, on actuation, also exhibits similar azimuthal variation.

Figure 3:
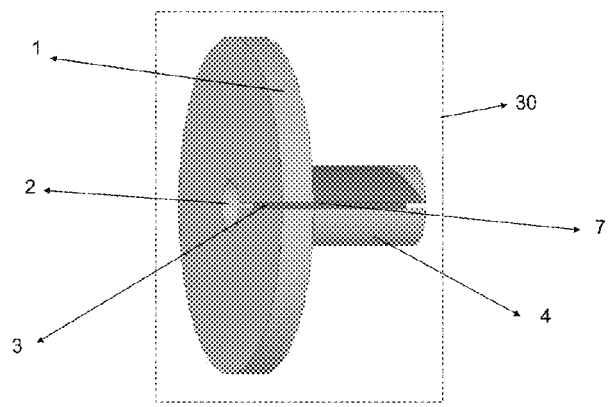
FIG. 3 illustrates a device for generating optical vortex in accordance with an embodiment.

FIG. 3 illustrates the device assembly for generating optical vortex according to one of the embodiments. Figure illustrates the construction of the device, wherein, the piezo-electric actuator (4) is coaxially joined to the mirror (1) so that the through cut (7) formed between the inner (9) and the outer diameter (8) of the tube (12) overlaps with the radial slit (3) of the mirror (1).

PZT tubular actuator (4) is bonded or joined or securely fitted onto the non-reflective side of the mirror. Further, the actuator may be glued to the mirror by means of a special adhesive. The actuator is glued to the rear side of the mirror in such a way that central hole in the mirror and the inner diameter of the PZT tube match exactly. More specifically, the piezo-electric tube is joined to the mirror such that the inner diameter of the tube superimposes with the hole of the mirror and the radial slit provided in the mirror and through cut (7) formed between the inner (9) and the outer diameter (8) of the tube (12) have the same angular orientation with respect to particular reference. In addition, the line passing through the center of the radial cut in the mirror matches with the center of longitudinal cut in the PZT tube.

Figure 4:
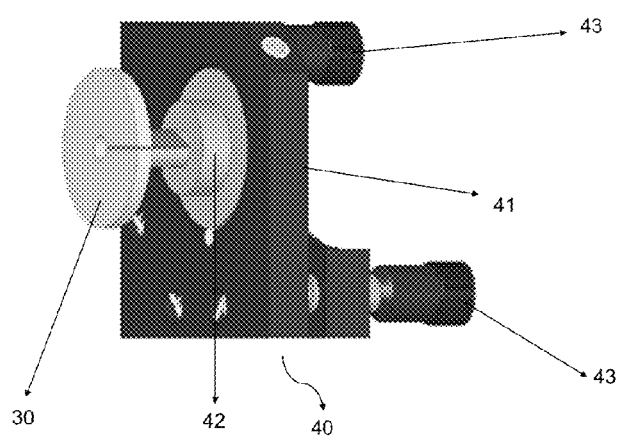
FIG. 4 illustrates a CAD model of mounted assembly of the device in accordance with an embodiment.

As regards FIG. 4, the said figure illustrates the construction of mounting of the said device, wherein, the backside of the PZT tubular actuator (4) is glued to a ceramic ring (41) and the whole assembly is held in a tilt mount (42) for providing x- and y-tilts to the said device (30). The said mount being provided with screws (43) for adjusting the tilt.

Figure 8:
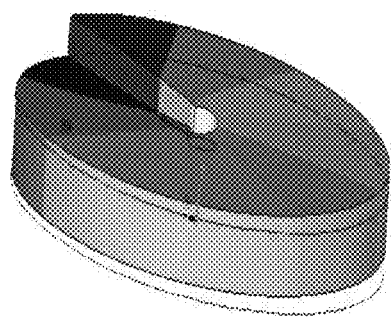
FIG. 8 illustrates out of plane displacement of the AHM in accordance with an embodiment
Figure 9:
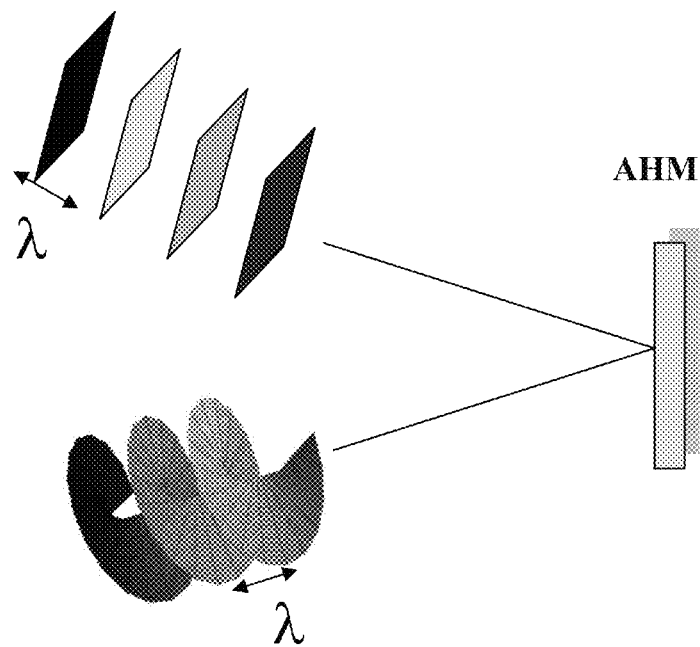
FIG. 9 illustrates the formatting of optical vortex when a light beam is incident on AHM in accordance with an embodiment Skilled artisans will appreciate that elements in the drawings are illustrated for simplicity and have not necessarily been drawn to scale. For example, the dimensions of some of the elements in the drawings may be exaggerated relative to other elements to help to improve understanding of embodiments.

It can be noticed from FIGS. 8 and 9, Adaptive helical mirror generates optical vortices by incorporating azimuthally varying phase change on a plane wave incident on its surface. When excitation voltage is applied to the PZT tubular actuator (4) it generates azimuthally varying expansion or contraction in the PZT tube (12), depending upon the polarity of the excitation voltage, resulting in bending the AHM in the form of a single turn helix (as shown in FIG. 8). The maximum change in surface height (deviation from the plane surface) across the radial cut also called step height is a function of excitation voltage. For a particular value of the excitation voltage, this step height can be made equal to half the wave length of operation i.e. $\lambda/2$ ($\lambda$, being wave length of operation). Under such conditions, a plane wave after reflection from AHM will accumulate maximum path length variation equal to $\lambda$ or phase change of $2\pi$ and thereby gets transformed to a vortex beam of unit topological charge. For generation of a vortex of higher topological charge, the required (maximum) expansion/contraction in the PZT tube would be multiple of half the wavelength of operation (i.e. $n\lambda/2$, where n is an integer).

FIG. 9 represents a plane wave reflected from the adaptive helical mirror, acquires helical shape. If U'(r, θ, z) is the amplitude of a plane incident on the AHM (under actuation), the reflected beam will have the helical wave front expressed by $$U'(r, \theta, z) = U \exp(ik\Delta z(r, \theta))$$

Wherein, $\Delta z$ is the path length difference, which has azimuthal dependence, created by the AHM, and k is the propagation constant.

As per the constructional features AHM, as described here, the presence of the central hole ensures that there is uniform distribution of the azimuthal force that is developed in the mirror when excitation voltage is applied to the PZT tubular actuator. Furthermore, the size of the inner diameter of the PZT tubular actuator is chosen to be equal to the central hole in the mirror substrate. This ensures that the azimuthal force developed by the PZT tubular actuator appears close to and along the inner circle of the mirror. Therefore, the surface profile of the AHM, under actuation, exhibits only the azimuthal variation. The out-of-plane displacement (deviation from the plane surface as shown in FIG. 8) of the AHM is maximum on one side of the radial cut and minimum on the other side, such that there is discontinuity in its surface profile across the radial cut. The maximum out-of-plane displacement across the radial cut, also called step height, is a function of the excitation voltage.

The excitation voltage required for generating optical vortices of different topological charge, using Adaptive helical mirror (AHM) is as under:

| Topological charge of optical vortex | Required path length change (max.) along azimuthal direction | Required, out of plane displacement in AHM across the radial cut | Required Excitation voltage |
|---|---|---|---|
| 1 | λ (=0.632 μm) | λ/2 (=0.316 μm) | 220 V |
| 2 | 2λ (=1.264 μm) | λ (=0.632 μm) | 440 V |
| 3 | 3λ (=1.896 μm) | 3λ/2 (=0.948 μm) | 660 V |
| 4 | 4λ (=2.528 μm) | 2λ (=1.264 μm) | 880 V |

It is should be noted that the laser used for testing the AHM is Helium-Neon. Hence wavelength of operation is 632.8 nm. AHM being reflective elements, it produces a path length change in the optical beam twice its out of plane displacement.

In view of the above table, for a particular value of excitation voltage, this step height can be made equal to half the wavelength of operation, i.e., $\lambda/2$ ($\lambda$, being the wavelength of operation). Under such conditions, a plane wave after reflection from the AHM will accumulate maximum path length variation equal to $\lambda$, or phase change of $2\pi$ and thereby will be transformed into a vortex beam of unit topological charge. The step in the surface height (=λ/2) of the AHM across the radial cut is caused by the expansion or contraction in the tubular actuator across its longitudinal cut. For HeNe laser ($\lambda$=0.6328 μm), the required expansion/contraction across the longitudinal cut of the piezo-tube is 0:3164 μm. Substituting the chosen parameters of the PZT tube (l=12:5 mm, $d_{31}$=115 pm=V, and t=1 mm) in Eq. (1), the voltage required for a maximum expansion/contraction of 0:316 μm turns out to be ~220 V. For generation of a vortex of higher topological charge, the required (maximum) expansion/contraction in the PZT tube should be a multiple of half the wavelength of operation (i.e., nλ/2, where n is an integer). Accordingly, the requirement for the excitation voltage to generate a vortex of higher charge also increases by the same factor. Here, it is important to note that generation of a vortex of opposite polarity may not be possible by simple reversal of the excitation voltage. Because of the inherent hysteresis present in most of the PZT materials, additional voltage is required to remove the remnant of polarization in the PZT tube (and hence the remnant of out-of-plane displacement in the mirror). Thus, the voltage required to generate an optical vortex of a given polarity is, in general, lower than the voltage required for generating a vortex of reverse polarity.

Figure 5:
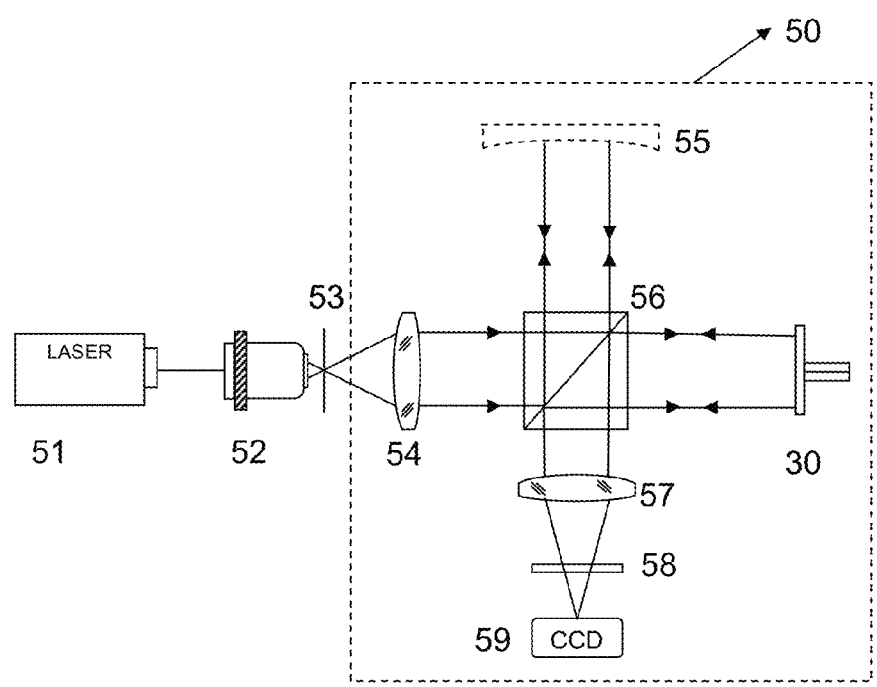
FIG. 5. illustrates a testing assembly for testing and evaluating optical vortices generated by the device in accordance with an embodiment.
Figure 6:
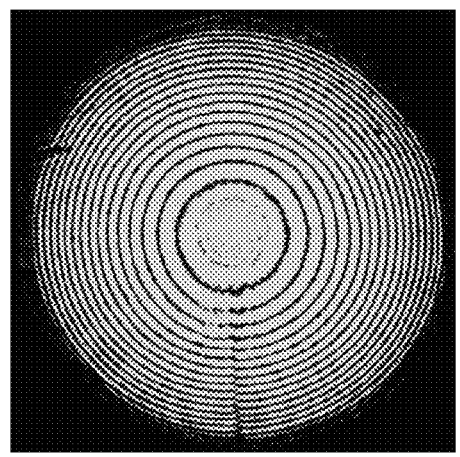
FIG. 6 illustrates interferograms with circular fringes, when the device for generating optical vortex is not actuated in accordance with an embodiment.

FIG. 5. illustrates an experimental setup used for testing the operation of AHM. A 5 mW, He—Ne laser (51) @632.8 nm is used as coherent optical source. Any other coherent optical source/laser in visible or near IR/UV region can be used equally well and that lies within the scope of the present embodiments. The laser light is spatially filtered using a microscope objective (52) and a pin hole (53). The spatially filtered light is collimated using a 500 mm focal length lens (54). The collimated light is launched on cube beam splitter (56) of a Michelson interferometer (50), which carries a concave mirror (55) in one arm and an AHM (1) in the other. The light waves reflected from the AHM and the concave mirror is recombined to generate interference pattern. Another lens (57) focuses the interference pattern on a CCD camera (59). A variable intensity filter (58) placed before the camera regulates the light intensity reaching the camera.

Figure 7A:
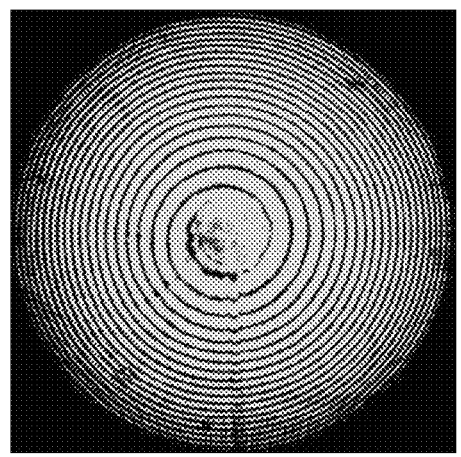
FIGS. 7A-7E illustrates the interferograms with spiral fringes, confirming the generation of optical vortices in accordance with an embodiment.
Figure 7B:
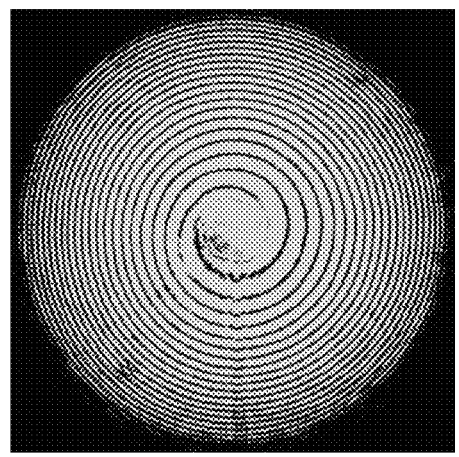
Figure 7C:
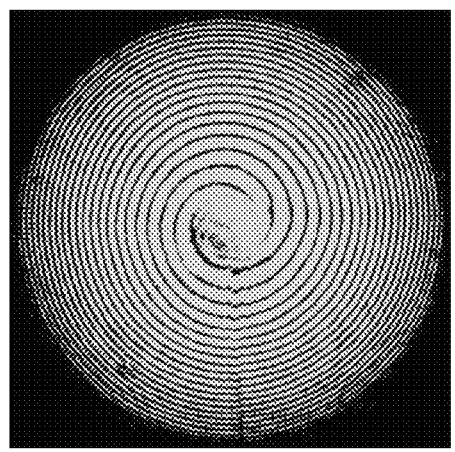
Figure 7D:
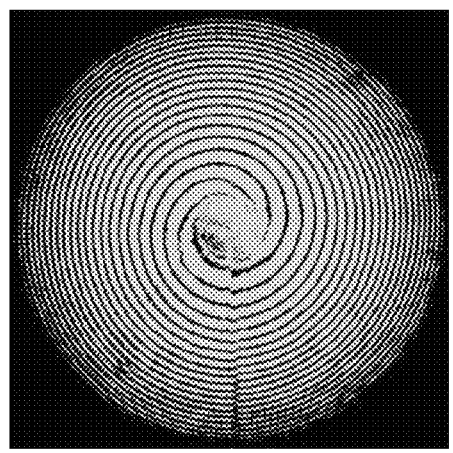
Figure 7E:
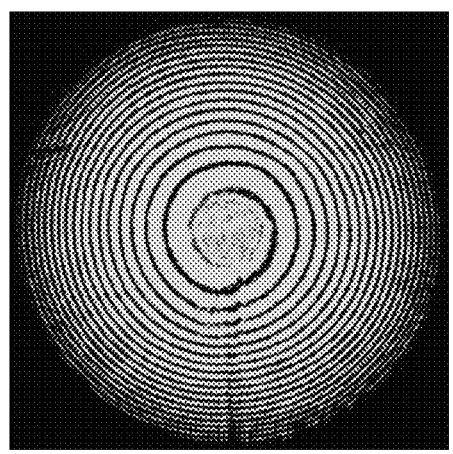

The generation of vortex field by the AHM is confirmed by formation of spiral fringes as shown in FIG. 7A-7D. When AHM is not actuated, the plane wave reflected from it interferes with the spherical wavefront (formed after reflection from concave mirror) to form circular fringes, as shown in FIG. 7. On actuation, the AHM transforms the plane wave incident on it to a vortex beam. The interference of vortex beam and the spherical wave results in the formation of single or multi-start spiral fringes in the interference pattern. FIGS. 7A-7D depict fringe patterns with one, two, three and four start spiral fringes corresponding to optical vortices of topological charge 1, 2, 3, and 4, respectively. The fringes are seen to spiral in the anti-clockwise direction. Optical vortices of topological charge 1, 2, 3 and 4 are obtained for excitation voltages of nearly 220V, 440V, 660V and 880V, respectively. The values of these voltages would change for generation of vortex beams for a different wavelength or if there is any change in one of more parameters of the AHM. The reversal of excitation voltage changes the spiraling direction of the fringes. FIG. 7E depicts spiral fringes (spiraling in the clockwise direction) corresponding to optical vortex of charge −1.

The dimensions of the thin flat mirror and that of the PZT tubular actuator can be modified to further enhance the performance of the AHM and that lies entirely within the scope of the present embodiments.

The real time control on the topological charge by the AHM makes it attractive from the point of view of various applications, such as adaptive optics, quantum computing, optical switching and communication, etc., as will be described below.

The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The device for generating a optical vortex of desired topological charge as described in the present application have a wide variety of applications in diverse fields, not limiting to, some of these applications are listed below.

1. Optical beams carrying vortices can be used as optical tweezers i.e., for trapping of atoms and micron-sized particles. This has wide-spread use in Laser Cooling (cooling of gases to extremely low temperature by use of laser beams) and Bio-Photonics.
2. Optical beams carrying vortices possess orbital angular momentum. Therefore these beams can be used for rotating the micro-particles. This is useful in generating micro-mechanical pumps & motors.
3. Optical vortices find applications in Quantum Computation (Optical Computers).
4. Optical vortices have applications in Data Encryption (coding & decoding of data in Laser Communication).
5. Optical vertices are useful in interferometry and phase contrast microscopy. Interferograms obtained with vortex beams can distinguish between elevation & depression in the specimen.
6. Other applications of optical vortices include image processing, optical switching, beam collimation testing.

The above mentioned list provides only examples of few areas of application. However, the application of optical vortex generated by the device of the present application should not be restricted to only the above mentioned areas.

The invention claimed is:

1. A device for generating an optical vortex, comprising:
   a circular mirror having a hole at a center and a radial slit extending from the hole to a periphery of the circular mirror; and
   a piezo-electric actuator, comprising
      a hollow tube having an inner diameter being equal to a diameter of the hole of the circular mirror,
      a through cut provided along a length of the hollow tube extending from the inner diameter to an outer diameter of the hollow tube,
      an inner electrode being formed on an inner wall of the hollow tube; and an outer electrode being formed on an outer wall of the hollow tube such that the length of the outer electrode increases continuously in an azimuthal direction across the outer wall;
   wherein,
   the piezo-electric actuator is coaxially joined to the circular mirror so that a slit formed between the inner diameter and the outer diameter of the hollow tube overlaps with the radial slit of the circular mirror; and
   in response to applying one of a plurality of excitation voltages across the inner electrode and the outer electrode, the hollow tube undergoes a change in length associated with the one of the plurality of excitation voltages which in turn transforms a shape of the circular mirror into a single turn helix, wherein a maximum out-of-plane displacement of the circular mirror varies between 0.316 μm after application of an excitation voltage of 220 V and 1.264 μm after application of an excitation voltage of 880 V.

2. The device as claimed in claim 1, wherein a reflective side of the circular mirror is coated with silver.

3. The device as claimed in claim 1, wherein both the inner wall and the outer wall of the hollow tube of the piezo-electric actuator are coated with silver to form the inner and outer electrodes.

4. The device as claimed in claim 1, wherein the outer electrode formed on the outer wall of the hollow tube is helical in shape.

5. The device as claimed in claim 1, wherein the hollow tube of the piezo-electric actuator is made up of piezo-ceramic material.

6. The device as claimed in claim 5, wherein the piezo-ceramic material of the hollow tube is poled along a radial direction.

7. The device as claimed in claim 1, wherein the length of the hollow tube varies along the azimuthal direction by way of expansion or contraction upon application of one of the plurality of excitation voltages across the inner and outer electrodes.

8. The device as claimed in claim 1, wherein a first end of the hollow tube is joined to a non refractive side of the circular mirror by adhesive.

9. The device as claimed in claim 8, wherein a second end of the piezo-electric actuator is glued securely to a ceramic ring by means of the adhesive and the device is held in a tilt mount for providing tilt motion along two orthogonal directions.

10. The device as claimed in claim 1, wherein an azimuthal phase variation of the optical vortex generated by the device is continuous.

11. The device as claimed in claim 1, further comprising a voltage source for varying a topological charge of the optical vortex generated by the device both in magnitude and sign.

12. The device as claimed in claim 1, wherein a maximum path length change of a plane wave reflected from the circular mirror varies between 0.632 μm after application of the excitation voltage of 220 V and 2.528 μm after application of the excitation voltage of 880 V.

13. The device as claimed in claim 1, wherein the maximum out-of-plane displacement is across the radial slit of the circular mirror.

* * * * *